United States Patent [19]

Scully et al.

[11] Patent Number: 4,819,191

[45] Date of Patent: Apr. 4, 1989

[54] ELECTRONIC CALENDARING METHOD TO ESTABLISH CALENDAR FLOATING TRIGGERS FOR CALENDARED EVENTS AND PROCESSES

[75] Inventors: Keith J. Scully, Austin, Tex.; Harinder S. Singh, Boca Raton, Fla.

[73] Assignee: International Business Machines Corporation, Armonk, N.Y.

[21] Appl. No.: 8,039

[22] Filed: Jan. 29, 1987

[51] Int. Cl.[4] .............................................. G06F 15/40
[52] U.S. Cl. .................................... 364/518; 364/521; 340/706
[58] Field of Search ............................ 368/29, 10, 43; 340/706, 717; 364/521, 200 MS File, 518, 401, 407

[56] References Cited

U.S. PATENT DOCUMENTS

| | | | |
|---|---|---|---|
| 4,194,196 | 3/1980 | Mohiuddin | 340/711 |
| 4,591,840 | 5/1986 | Curtis et al. | 340/706 |
| 4,626,836 | 12/1986 | Curtis et al. | 340/706 |
| 4,645,238 | 2/1987 | Vincent et al. | 283/67 |

OTHER PUBLICATIONS

McGilton H. "Introducing the Unix System" McGraw-Hill Book Company-1983 pp. 107-129.
Sudyam B. "Time Management Business in its Finest Hour" Personal Computing—Mar. 1982 pp. 34-40.
Rothfeder J. "Time is of the Essence" Personal Computing Jun. 1983 pp. 56-61.

Primary Examiner—Gary V. Harkcom
Assistant Examiner—Phu K. Nguyen
Attorney, Agent, or Firm—Richard E. Cummins

[57] ABSTRACT

An electronic calendaring method for use in a data processing system has a plurality of workstations, each of which is assigned to a different individual who maintains an electronic calendar on the system. The method establishes a plurality of data structures for storing data that is entered into the system interactively by the calendar owner during the process of calendaring an event which involves a number of other calendar owners e.g. a meeting. A Trigger data structured is included to store data at the time an event is being calandered that provides a reminder to the meeting originator or calendar owner. The type of reminder may be selected by the meeting originator provided the system hardware supports the underlying technology. The reminder may be just a visual message on the display, an audio tone, an audio message or any combination. The official ID of the event that is to be triggered is included in the Trigger data structure. The method allows the Trigger to "float" with the identified event so that the Trigger established by the meeting originator may be automatically employed by the other calendar owners who received a notice on the system inviting them to the meeting. If the meeting is changed or cancelled, the other invitees' triggers are changed automatically as is the originators' merely by changing the meeting notice. The method also permits a calendar owner to start a process (application program) that can be run on the system by use of the Trigger data structure.

12 Claims, 4 Drawing Sheets

```
MOVE THE CURSOR TO EACH SELECTION OR  KEY THE ITEM  DIRECTLY   AND   HIT   ENTER

1. Calendar Entry, Meeting,                              1  2
   Appointment, Trigger,              3  4  5  6  7  8  9
   Note, Vacation,                   10 11 12 13 14 15 16
   Holiday, Offsite,                 17 18 19 20 21 22 23
   Not Normal Work Hours             24 25 26 27 28 29 30
                                     31
2. View Select
                                      1  2  3  4  5  6
3. Composite Calendar                 7  8  9 10 11 12 13
                                     14 15 16 17 18 19 20
                                     21 22 23 24 25 26 27
                                     28 29 30

Command:_____

PF1=Help     PF2=Return to System    PF8=Next Screen
```

FIG. 3a

```
MOVE THE CURSOR TO EACH SELECTION OR KEY THE ITEM DIRECTLY THEN HIT ENTER
Classification List: 1 Meeting   2 Appointment   3 Offsite   4 Vacation   5 Holiday
                     6 Note   7 Not Normal Work Hours
Additional Criteria: BX Priority X (X=1 to 10)   C Open Time
                     D User Defined Field (D+ 8 Characters)
CLASSIFICATION:  1   (Select one classification number from the above list)
USER DEFINED FIELD _____ PRIORITY   02   (1=highest,10=lowest)
EVENT IDENTIFIER: D35 MEETING A1
MEETING/APPOINTMENT INFORMATION:
          Date 10/07/86      Start Time:1:15 PM     End Time: 5:00 PM
          Date 10/09/86 R2   Start Time:8:30 PM     End Time: 5:00 PM
       (Rx after Date will repeat the event at the same time, x number of days)
       Names List : D35 NAMES A1
         Caller   : TOM ROBERTS
         Subject  : 1987 Budget
           Place  : Conference Room 128F
           Details:
       AUTO SCHEDULE: YES  NO       EVENT DURATION(minutes):    (1 TO 480)
       SEARCH CRETERIA;2+C+A 1+C+A
       Enter the classification /criteria Number separated by a space. Select
       from
       the list above. Enter selections using the following format:
       Classification+(C-Confirmed or T-Tentative)+(A-Attending or M-May Attend)

PF1=Help    PF3=Cancel  PF5=Send Notice  PF6=Begin Search
   PF8=Next Screen(Security, Status, Trigger)  PF9=File  PF11=Add One Line
```

FIG. 3b

```
MOVE THE CURSOR TO EACH SELECTION OR  KEY   THE ITEM   DIRECTLY   AND   HIT   ENTER

SECURITY:      Public   Shared     Private
   (pick one)
STATUS:        Tentative           Confirmed
   (pick one)
TRIGGER:         Message   Audio    Process
   (All three may be picked)
      Date: 10/07/86      Time: 1:00 PM
      Date: 10/09/86      Time: 8:00 AM
   (PF11 will scroll and add additional Date Lines while on the Date line)
   (Rx after Date will repeat the event at the same time, x number of days)
      Names List: D35/AUSVM1 (Enter The Notification List VNET Address)
      Message   : The department meeting starts in 15 minutes_____
                 (PF11 will add one line)
      Process   : INVEST01/AUSVM1   Enter The Process VNET Address
                  Pick up these calculations before the Budget Meeting TRIGGER FIXED OR FLOAT?    Fixed      Float
  (pick one)
      Float with Event Identifier:  D35 MEETING A1
    (If this event moves, the trigger will be moved to the same relative time)

PF1=Help    PF3=Cancel   PF5=Send Notice PF6=Begin Search
PF7=Previous Screen PF8=Next Screen   PF9=File   PF10=Add One Line
```

FIG. 3C

ELECTRONIC CALENDARING METHOD TO ESTABLISH CALENDAR FLOATING TRIGGERS FOR CALENDARED EVENTS AND PROCESSES

FIELD OF INVENTION

This invention relates in general to electronic calendaring methods, which provide a reminder at a predetermined time prior to the scheduled time of a calendared event and in particular to a method in which the remainder "floats" with the calendared event.

CROSS-REFERENCES TO RELATED APPLICATIONS

1. Co-pending application Ser. No. 008,033 filed concurrently herewith, entitled "Method For Developing Automatic Replies in an Interactive Electronic Calendaring System," and assigned to the assignee of the present application is directed to an electronic calendaring method in which a calendar owner can respond automatically to requests for participation in events being calendared by another person. The nature of the reply is based on an analysis of the parameters set forth in the request and an algorithm employing a set of prioritized criteria that the calendar owner has established to provide the automatic response.

2. Co-pending application Ser. No. 008,034 filed concurrently herewith, entitled "Method For Concurrently Displaying Entries From a Plurality of Different Electronic Calendars Based on Interactively Entered Criteria," and assigned to the assignee of the present application is directed to an electronic calendaring method in which a calendar owner can display a set of calendar entries which have been selected based on one or more criteria, from different calendars within a time span that has been established by a calendar owner who is requesting a specific "view" of calendars on the systems.

3. Co-pending application Ser. No. 008,249 filed concurrently herewith, entitled "Method For Automatically Reconciling Entries on Two Copies of Independently Maintained Electronic Calendars," and assigned to the assignee of this application is directed to an electronic calendaring method in which a calendar owner who keeps a detached personal copy of his master calendar can automatically reconcile the calendar entries that have been made independently on each calendar since the reconciliation, and interactively resolve any calendar event conflicts.

4. Co-pending application Ser. No. 008,038 filed concurrently herewith, entitled "Electronic Calendaring Method Which Provides for Automatic Assignment of Alternates In Requested Events," and assigned to the assignee of this application is directed to an electronic calendaring method in which a calendar owner, who receives a request to participate in a calendared event originated by another calendar owner, can assign an alternate to the event that will be designated in the automatic response which reflects the assignment of an alternate to the event. The assignment of the alternate is based on the relationship of the information that accompanies the request and criteria that the calendar owner has pre-established for each potential alternate.

5. Co-pending application Ser. No. 008,036 filed concurrently herewith for Cree, et al, entitled "Electronic Calendaring Method for Automatic Confirmation of Resource Availability During Event Calendaring," and assigned to the assignee of this application is directed to an electronic calendaring method in which a calendar owner, when calendaring an event such as a meeting, which requires, in addition to a meeting room, such resources as a projector, video conferencing equipment, etc., automatically receives confirmation that the requested articles are available and reserved for the calendared meeting event.

BACKGROUND ART

The prior art has disclosed a number and variety of interactive electronic calendaring systems and method. The objective of all of these systems is primarily to assist the person who, for a number of different reasons, maintains a calendar of future events containing various information about the events at entry points on the calendar which relate to the time of the event.

The increase of personal computers and intelligent workstations in recent years has made it possible for calendar owners to establish and maintain these calendars on these interactive type data processing systems. Hence, the term "electronic calendaring systems."

Two general types of interactive electronic calendaring systems have thus evolved in the art. In one type of calendaring system, the owner of the calendar is generally also the user of the workstation and that workstation is generally not part of a larger network. Generally, in these type of systems, the calendar function involves presenting a screen to the user which represents a day calendar format divided into a number of time periods. Each period is capable of displaying a limited amount of text that the user enters. In some systems, the day calendar can scroll vertically to present more time periods and/or horizontally to permit longer text entries. The operator can "page" forward or backward and, in most arrangements, can display a requested date. These calendaring methods generally do not limit the type of event that is calendared nor the terminology employed at any of the entry points and, to that extent, function in the same manner as conventional manner calendars or appointment books.

Electronic calendars do possess an advantage over manual entry calendars, however, in that the calendar owner can, in many systems, enter an alarm type entry which places a reminder message on the display screen at a predetermined time and date. The message may also be accompanied by an audio signal in order to get the user's attention. In most cases, the message is a reminder of some subsequent calendared event that the calendar owner has entered.

Another advantage of the electronic calendaring systems is that they often permit the calendar owner to scan a large number of calendar entries covering an extended period of time to find a specific defined entry. This latter function is achieved generally in a manner of seconds.

In general, while this type of electronic calendaring system is an improvement over the manual approach to maintaining a calendar, it does have its limitations. For example, the alarm function, when it is used as a reminder, is completely independent of the event for which the alarm is established. As a result, if the event is cancelled or the time of the event is changed, then a new alarm entry must be created by the user, and the old entry deleted or moved.

The other type of calendaring arrangement that has developed in the prior art involves multi-user environments having a large number of terminals or workstations which are generally part of a larger communication network that has been established to permit the users to interact with each other and with data maintained on the system. In this environment, a user at a terminal or workstation can send a message to one or more of the other users on the network and is notified when the addressee has received and read the meassage. In most of these environments, each user generally maintains a calendar, and in many of these environments the reason for the system interconnections among workstations is dictated by the need of these users to interact. Further, the nature of such interaction generally involves reference to respective calendars.

A considerable amount of time is therefore spent in many organizations, with people checking and rearranging their calendars to accommodate various events such as meetings, presentations, etc. In this environment, the electronic calendaring systems and method have progressed to the point where a person who is calling a meeting can at least view the calendars of a number of users that he intends to invite to a meeting, to determine a common available time for the meeting. See for example U.S. Pat. No. 4,626,836 filed 11/4/83 entitled "Method of Scheduling Meetings". See also the cross-referenced application Ser. No. 008,034 which describes an improved method of finding a meeting time.

However, in each of those systems, once the meeting time is set and the prospective participants notified of the date, time, and subject of the meeting, each participant must update his own electronic calendar and also reply to the meeting request. While the system can facilitate the request and reply message process, it is sometimes less frustrating to merely use the telephone to arrive at a mutually convenient time.

Co-pending cross-referenced application Ser. No. 008,033 discloses an electronic calendaring method in which replies to meeting requests are developed automatically for the calendar owner, based on criteria that the user has established or a set of default criteria that the system has established. This method is a vast improvement over prior art non-automatic systems. However, in the automatic method, each participant in the meeting must provide an entry into his own calendar to be reminded of the meeting that was automatically calendared for him. This is the same awkward position that the calendar owner who is not attached to a network is in, that is, if the meeting is changed or cancelled, the responsibility for managing the alarm for the calendared event is the receivers' responsibility. The invitee must therefore individually cancel the reminder or move it to the new time if the meeting time has been changed. These functions generally involve programming complexities that are costly and time-consuming.

Electronic calendaring systems also permit calendar owners to enter notes into the system to remind them to do certain things prior to a scheduled event, such as obtaining a current printout of the latest sales figures just before the meeting. If the owner is away from the system at the time the note is triggered by a reminder, there may not be sufficient time to obtain the printout at the time the owner remembers to order the printout.

The present invention provides an electronic calendaring method in which the above-defined problems of the prior art are eliminated. In accordance with this new method, if the calendar owner changes a calendar event entry to a different time, any alarm-type message that the owner entered in connection with the original entry may be automatically changed when its related event is changed.

In a network environment in which calendar entries are created automatically in response to requests by one owner for the other owner's participation in the event, the new method may automatically duplicate for the other calendar owners, any alarm-type messages that the originator has established on his own calendar and can insure that these messages are moved or modified if the time of the event is moved or the event cancelled. The new method also allows an external process that is related to a calendered event to be started automatically at a preset time and float with the related event.

SUMMARY OF THE INVENTION

The present invention is directed to a method for assisting a calendar owner in maintaining an electronic calendar on an interactive type terminal such as an intelligent workstation or a standalone personal computer system. The method involves creating a calendar object data structure of the type described in cross-referenced application Ser. No. 008,034, in which information of a predetermined nature concerning an event that is being calendared is stored, as the data is being entered into the system interactively by the calendar owner in response to displayed prompts for the various pieces of data.

In accordance with the improved method, a new data structure, referred to as the "Trigger data structure" is established for use by the system. A trigger data structure comprises a set of attributes that causes the system to take some action at a predetermined time. The attributes include a relative date and time for the trigger or an absolute date and time. The owner/user can also specify the trigger type which depends on the technology supported by the system hardware and may include an audio alarm, a visual indication on the display screen, or even the name of a process (i.e., an application program) to be started.

The method involves the step of presenting to the user/owner, a display screen in the process of calendaring an event that requests data for the Trigger function. As the data is entered by the user/owner, it is stored at the appropriate field positions of the trigger data structure.

The method then automatically establishes the correct time for the trigger to be activated from the data entered and the calendar system then compares the system clock to the automatically established trigger time at present clock intervals. If the comparison indicates a match, the identified trigger is activated and the user or users are notified, or the external process identified is dispatched.

In the situation where the calendar event is distributed to other owners/users in the network to update their calendars with the corresponding entry, the method also automatically establishes the time for the trigger to be activated for the other calendar owners.

Since the trigger data structure includes a field to identify the event being calendared, if the time of the event is changed or the event is cancelled, the method also automatically modifies the time the trigger was to be actuated. This latter step occurs automatically for the other users when they are notified of the change in the time of the calendared event.

It is therefore an object of the present invention to provide an improved electronic calendar method.

Another object of the present invention is to provide a method to assist the operator of an interactive data processing type workstation to maintain an electronic calendar that can alert the user a predetermined time before the scheduled time of a calendar event.

A further object of the present invention is to provide a method to assist the operators of interactive type data processing terminals that are interconnected through one or more communications links to maintain their respective electronic calendars in a manner that permits an event that has been automatically calendared on more than one calendar, to also automatically generate a reminder to the respective calendar owners, a predetermined time before the event is to occur.

A still further object of the present invention is to provide an electronic calendaring method in which a calendar owner may specify a time for a reminder when an event is being calendared and the time for the reminder is automatically modified in response to any change in the time of the calendared event.

Objects and advantages other than those mentioned above will become apparently from the following description when read in connection with the drawing.

DESCRIPTION OF THE DRAWING

FIGS. 3a through 3c illustrate display screens that are presented to a calendar owner during the event calendaring process.

BRIEF DESCRIPTION OF THE PREFERRED EMBODIMENT

Figure 1:
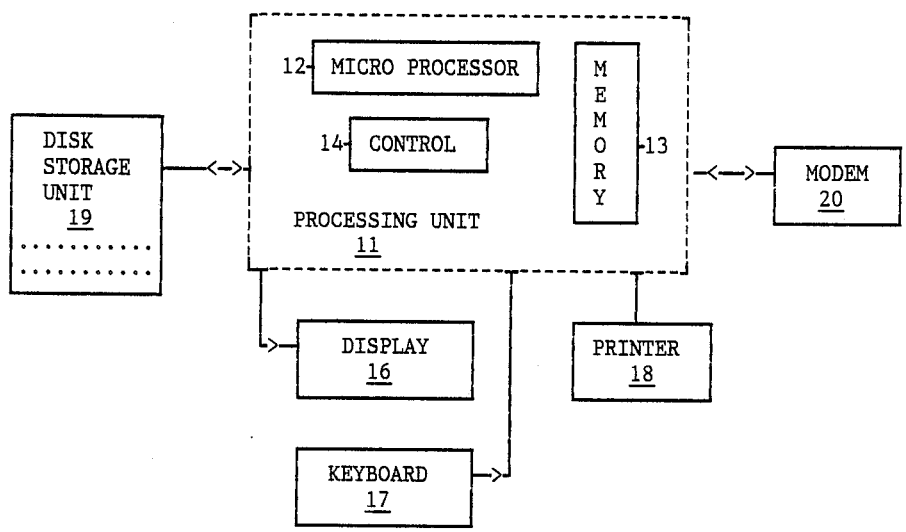
FIG. 1 is a block diagram of an interactive data processing terminal in which the electronic calendaring method of the present invention may be advantageously employed.

FIG. 1 illustrates the functional components of an interactive type data processing terminal on which the electronic calendaring method of the present invention may be advantageously employed. The terminal comprises a processing unit 11 which includes a microprocessor block 12, a semiconductor memory 13, and a control block 14 which functions to control input/output operations in addition to the interaction between the microblock processor block 12 and the memory unit 13.

The terminal further includes a group of conventional peripheral units including a display device 16, a keyboard 17, a printer 18, a disk storage unit 19, and a modem 20. Since the details of the above-described functional blocks form no part of the present invention and can be found in the prior art, only a brief functional description of each block is set forth, along with a description of their interactions, sufficient to provide a person of ordinary skill in the art with a basis of understanding applicants' improved electronic calendaring method.

Processing unit 11 corresponds to the "system unit" of a personal computer system such as the IBM XT or IBM AT type systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 1 further includes a printer 18, which functions to provide hard copy output of data developed or stored in the terminal. Lastly, the modem 20 functions to transfer data from the terminal of FIG. 1 to a host system through one or more communication links which may be a commercial type link or a dedicated communication link.

Figure 2:
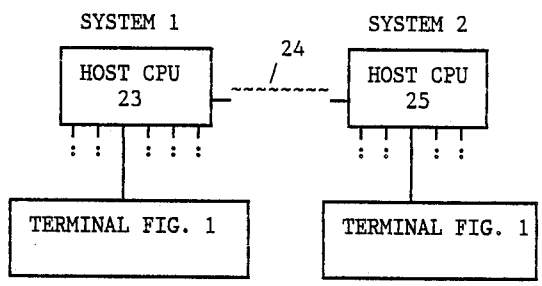
FIG. 2 is a block diagram of a network of terminals of the type shown in FIG. 1.

FIG. 2 illustrates a network 21 of interactive type workstations of the type shown in FIG. 1. As illustrated, the network includes a plurality of terminals which are interconnected with each other and to a host central processing unit 23, which in turn is connected via communication link 24 to a second host processing unit 25, which also connects to another network 26 of interactive workstations. Functionally, the system operates to allow one terminal to communicate to one or more other terminals using established communication protocols, so that the various serially connected communication links are transparent to the operator. Such systems are well known in the art, and are currently in extensive commercial use. Since these communication links per se are not part of the present invention, only those details that are necessary for an understanding of the calendaring method of the present invention will be described. It should therefore be assumed in the following description, that each workstation on the network has a system node address and a "post office" address, and that to simplify the description, there is only one individual assigned to each node on the network. It should further be assumed that conventional communication services are provided by the system, such as directory listings of individual calendar owners and shareable resources such as meeting rooms, etc., which require scheduling. The system shown in FIG. 2 processes information as various types of data objects such as text data objects, graphic data objects, and calendar data objects. Each of these data objects are represented by a datastream which comprises a series of structured fields.

A calendar object datastream has the following sequence of structures.

```
Begin Document (BDT)
    Begin Page (BPG)
        Begin Calendar Data (BCL)
            Calendar Data Descriptor (CDD) (Optional)
            Calendar Data SF (CAD)
                Calendar Structures (COCA)
        End Calendar Data (ECL)
    End Page (EPG)
End Document (EDT)
```

The format of the datastream for other type data objects contain the begin document, begin page, end page, and end document data structures. Structured fields corresponding to those listed above for a calendar object are also employed for other type objects.

A structured field is a self-describing entity which contains related groupings of parameter values and triplets. The structure field, as shown below, has two parts: the Structured Field Introducer and the Structured Field Content.

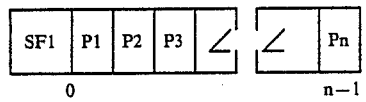

The structured field begins with a Structured Field Introducer. The syntax and semantics of the Structured Field Introducer are defined by the architecture which governs the datastream in which the structured field is found. The Structured Field Introducer contains as the first two bytes a parameter which defines the length of the structured field. It also contains an identification code which uniquely identifies the structured field.

The Structure Content portion of each structured field contains structures and triplets, which give the structured field its meaning. Parameters in the triplets define the attributes of the Calendar Object. Every parameter has a value either explicitly appearing in a triplet, inherited from a control structure in the datastream's hierarchy, or implicitly defined as a default. This default may also be the alternate action value.

Every structure is either required or optional. A required structure appears in the object because the function of that structure is required and for proper performance of the function an value is necessary.

An optional structure need not appear in the object either because the function of that structure is not required or because the function is required, but default values are acceptable for all parameters.

As shown above, a calendar data (CAD) structured field (SF) precedes the actual calendar data. A calendar data descriptor (CDD) SF can precede the CAD SF to provide formatting information for the data that follows.

Calendar data comprises named data structures and named triplets which are composed of parameters. A parameter is a variable to which a value is assigned. Parameters can be optional or required. Parameters are also classified as terminal or non-terminal. A terminal parameter is merely the last parameter in a string of parameters.

A parameter can have one of three types of values assigned.

1. NUM—This is a number or a numerical value.
2. COD—This is a code assigned a specific meaning.
3. BST—This is a bit string of binary elements, each of which is usually independent of the other.

In the following discussion it will be assumed that a byte comprises 8 bit positions numbered 0-7 from left to right, with position 0 being the high order position. Bit position 0 represents $2^{}7$ (2 to the 7th power), while bit 7 represents $2^{}0$ (2 to the 0 power).

The various calendar structured fields and calendar triplets are defined by the following type of table.

| BYTES | NAME | TYPE | MIN | MAX | LGTH | OPT |
|-------|------|------|-----|-----|------|-----|
| n-m   | name | type | v   | x   | www  |     |

In the figure:
BYTES refers to the position, indexed on zero.
NAME is the name by which reference is made to the parameter.
TYPE denotes the syntax of the parameter by "type,"
    The architected types NUM, COD, and BST were described earlier.
LGTH denotes the length of the field in terms of the exact number of bytes or the maximum number of bytes permitted.
OPT refers to the optionality of the parameter's appearance in the structure or triplet:
O means that the parameter is optional.
R means that the parameter's appearance is required.
If a required parameter is missing, an exception condition exits. The alternate action is to ignore the structure, self-defining field, or triplet to which the missing parameter belongs.

Syntactically descriptive material below the figure indicates what additional restrictions apply to the structure or triplet defined by the figure.

Calendar structures and calendar triplets which are relevant to the present invention will be described using the above-described format. After the structures are described, the display screens that are presented to calendar owners by the system in order to solicit information when a calendar owner wants to perform a calendaring function will be described. A flow chart setting forth the detailed steps of the method of the present invention will then be described in connection with the program listing of pseudocode that will assist persons skilled in programming interactive terminals to implement the method of the present invention.

Since the "Floating Trigger function" is used in connection with a calendared event, it is necessary to describe in detail the data structures that are employed by the system in the process of an owner calendaring an event on his calendar. In the preferred embodiment, calendar entries are classified into a number of different types. Since the system contemplates interchanging calendar data throughout the system, including terminals that are remotely connected, such as thoes shown in FIG. 2, entry types and presentation language are controlled by a defined architecture. While the same display screen may be employed to solicit the data for a number of different event types, the data structures and triplets, required or optional, will vary by event type.

While some of the structures to be described and the triplets associated with these structures are not directly involved in the view select function, they have been described in order to provide background for the reader and a basis for a comprehensive understanding of the claimed process and its relationship to the processes described and claimed in the cross-referenced application.

The various calendar object data structures to be described are preceded by a calendar data structure shown below.

| CALENDAR DATA (CAD) STRUCTURE FIELD (SF) | | | | | | |
|---|---|---|---|---|---|---|
| BYTES | NAME | TYPE | MIN | MAX | LGTH | OPT |
| 0-1 | Structured Field Length | NUM | 8 | 32767 | 2 | R |
| 2 | Structured Field Type1 | COD | X'D3' | X'D3' | 1 | R |
| 3 | Structured Field Type2 | COD | X'EE' | X'EE' | 1 | R |
| 4 | Structured Field Type3 | COD | X'5B' | X'5B' | 1 | R |
| 5 | Flags | BST | 0 | 0 | 1 | R |
| 6-7 | Segment Sequence Number | NUM | 0 | 32767 | 2 | R |
| 8-7+n | Calendar Data | | * | * | n | R |

*Values depend on the Calendar Object structure and triplet specification.

The Calendar Data SF (CAD) identifies the data as calendar data and specifies the length of the calendar data. The Calendar Data SF contains, for example, up to 32767 bytes of calendar structures and calendar triplets (called "Calendar Data"). Calendar data varies with the function employed by the generator of the object.

MAJOR CALENDAR STRUCTURES DESCRIPTION

This section describes the major structures that are involved in the present invention. The structures consist of a mixture of calendar triplets. The triplets are described in the Calendar triplets Description section that follows this section.

The calendar structures are preceded by the Calendar Data structured filed (CAD). Parameter values specified by the system can be overridden by parameters specified in calendar data. For example, the Code Page of Symbols for Displaying and Printing Data.

In the structure description, bits are consecutively numbered from left to right starting with zero.

The format for all of the structures is the same. The format is shown below.

| BYTES | NAME | TYPE | MIN | MAX | LGTH | OPT |
|---|---|---|---|---|---|---|
| 0-1 | LENGTH | NUM | | | | R |
| 2-3 | TYPE | COD | | | | R |
| 4-n | TRPLT1 to TRPLTn | | | | | R | where

LENGTH=A two-byte value of the number of bytes in this structure including byte zero.

TYPE=A two-byte binary number that designates a specific structure function.

TRPLT1 TO TRPLTn=Calendar Structure Triplets.

The length of structures can vary depending on the number of triplets included.

If the length excludes all or part of an optional parameter in a triplet, then the value for that parameter and any parameters that follow are not changed; that is, the LENGTH field is used as specified.

If a structure is invalid or unsupported, an exception is raised. If the length field excludes a required parameter or triplet, an exception is raised. If a structure contains an invalid or unsupported parameter or triplet, an exception is raised.

MEETING (MTG) STRUCTURE

The meeting structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'85' | X'85' | 1 | R |
| 4-3+n | Meeting Triplets | | * | | n | R |

*Values depend on the triplet specification.

The MTG structure provides the fields necessary to interchange meeting information, the scheduling of meetings and requests for meeting information. It also provides a specific search classification to allow building a composite calendar for a specified list of calendar owners.

The Valid MTG Triplets are listed below and defined in detail in the following section.

ERROR ACTION (EAC)—An EAC triplet may occur in any sequence and is optional.

STRUCTURE ID (SID)—The SID specifies the ID for the meeting. An optional SID may be included to identify a Trigger (TRG) associated with the meeting.

DATA AND TIME (DTT)—The DTT triplet provides the meeting time(s) and date(s) and is required. DTT triplets must occur in ascending time(s) and date(s). A meeting that occurs at non-sequential times can be scheduled by using more than one DTT triplet specifying the required times.

NAME (NME)—Network Address (NAD), Postal Addresses (PAD) and User Status (UST) triplets may be used to provide user status and addresses for a named item. NME triplets and associated NAD, PAD and UST triplets may be included for both the CALLER (meeting owner) and the ARRANGER (meeting arranger). The Name Status byte specifies whether or not NAD, PAD and UST triplets follow the Name triplet which is optional.

USER STATUS (UST)—The UST triplet provides the role and status for the person named in the NME triplet. This triplet is only valid when it follows a NME triplet and is optional.

NETWORK ADDRESS (NAD)—The NAD triplet provides the network address for the person named in the NME triplet and is optional.

POSTAL ADDRESS (PAD)—The PAD triplet provides the the mailing address for the person named in the NME triplet and is optional.

EVENT STATUS (EVS)—The EVS specifies the meeting status and is optional.

TIME STAMP (TMS)—Only one TMS triplet is allowed in the MTG structure and it is optional.

ENTRY SECURITY (ESL)—If this control is omitted the security level is PUBLIC. Only one ESL triplet is allowed in the MTG structure and it is optional.

SET CODED GRAPHIC CHARACTER SET GLOBAL ID (SCG)—The SCG selects the character set and code page for characters contained in the triplets that follow the SCG in the calendart structure. The Network Address character set and code page are not affected by the SCG. The active code page is restored automatically at the end of the calendar structure.

SUBJECT (SBJ)—The SBJ triplet contains character data describing the meeting subject. One SBJ triplet is allowed in each MTG structure and it is optional.

PLACE (PLC)—The PLC triplet contains character data describing the meeting location. One PLC triplet is allowed in each MTG structure and is optional.

DETAIL (DTL)—The DTL triplet contains character data describing the meeting. If the Code Page or character Set is changed in the meeting description, the DTL triplet must be ended, a SCG triple inserted, and another DTL triplet built. It is optional.

RSVP (RVP)—The RVP specifies the need for an attendance response from the meeting invitee and it is optional.

If a MTG structure is received without all required triplets, an exception exists. The default action is to skip the structure and continue processing. If a MTG structure contains an unsupported or invalid triplet, an exception exists. The default action is to skip the triplet and continue processing. If a MTG structure contains a DTT triplet with dates and times not in ascending order or if the optional SCG triplet occurs at a position that does not immediately precede a triple with text data (DTL, SBJ, PLC), an exception exists. The default action, in both cases, is to ignore the triplet and continue processing.

NAMES LIST (NML) DATA STRUCTURE

The names list data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'8A' | X'8A' | 1 | R |
| 4-3+n | NML Triplets | | * | * | n | R |

*Values depend on the triplet specification.

The NML structure provides the fields to support a name, associated addresses and status. The NML may contain a list of items, such as an invitees list, by concatenating Name (NME), Address (ADR) and User Status (UST) sequences. The list may include one or more than one name and associated information.

The following Valid NMR Triplets for the NML DS were described in connection with the MTG structure.

ERROR ACTION, STRUCTURE ID, TIME STAMP, ENTRY SECURITY, SET CGCSGID, NAME, USER STATUS, NETWORK ADDRESS and POSTAL ADDRESS.

The Date and Time (DTT) triplet is not valid.

The following triplet, however, is optional for the Names List data structure.

NAMES LIST TYPE (NLT—Only one NLT triplet is allowed in the Names List structure. The NLT triplet specifies the type of data contained in the Names List. If the NLT is not specified, the list contains a list of names and or status and/or addresses that are not necessarily in one of the categories defined by the NLT triplet.

If a NML structure is received without a Structure ID triplet, an exception exists. The default action is to skip the structure and continue processing. If a NML structure contains an unsupported or invalid triplet, an exception exists. The default action is to skip the triplet and continue processing. Each sequence of the Names List structure triplets must occur in the listed order.

Optional triplets may be omitted from any sequence. If a NML structure is received with a triplet out of sequence, an exception exists. The default action is to skip the structure and continue processing. The above-described processing for handling exceptions is standard for most structures and therefore can be assumed for the following items.

TRIGGER(TGR) DATA STRUCTURE

The Trigger data structure is shown below.

| BYTES | NAME | TYPE | MIN | MAX | LGTH | OPT |
|---|---|---|---|---|---|---|
| 0-1 | Structured Field Length | NUM | * | 32767 | 2 | R |
| 2 | Structured Field Type 1 | COD | X'D3' | X'D3' | 1 | R |
| 3 | Structured Field Type 2 | COD | X'8F' | X'8F' | 1 | R |
| 4 | Trigger Type | BST | * | * | 1 | R |
| 5-48 | Meeting ID | COD | * | * | 44 | O |
| 49-64 | Process ID | COD | * | * | 16 | O |
| 65-Max | Tgr Triplets | | | | | |

The TGR structured field specifies a time that a notification will occur and or a process will begin.

MEETING ID=Fourty four byte identifier that selects the invitee list associated with a meeting. The selected list will be notified at the trigger time.

PROCESS ID=Sixteen byte identifier that selects the process to be started at trigger time. If the meeting ID is also present the selected list will be notified at the trigger time.

TRIGGER TYPE=Specifies whether the trigger is a message, audio tone, audio message, process or a combination trigger. Any combination of the following trigger types is allowed.

BIT

0=Message Trigger—A message will be circulated to the selected list at the selected time (DEFAULT)

1=Audio Trigger—An audio tone will be circulated to the selected list at the selected time.

2=Audio Message Trigger—An audio message will be circulated to the selected list at the selected time.

3=Process Trigger—A Process will start at the selected time.

The Triplets that are valid in a TGR structure are:
TMS (OPTIONAL), ESL (OPTIONAL), DTT (REQUIRED), SGC (OPTIONAL), DTL (OPTIONAL), SID (OPTIONAL), EAC (OPTIONAL)

VIEW SELECT (VSL) DATA STRUCTURE

The View Select data structure is shown below.

| BYTES | NAME | TYPE | MIN | MAX | LGTH | OPT |
|-------|------|------|-----|-----|------|-----|
| 0-1 | Structure Length | NUM | * | 32767 | 2 | R |
| 2 | Structure Type1 | COD | X'D3' | X'D3' | 1 | R |
| 3 | Structure Type2 | COD | X'95' | X'95' | 1 | R |
| 4-3+n | VSL Triplets | | * | * | n | R |

*Values depend on the triplet specification.

The VSL structure provides a way to request calendar views for specific category(s) and timespan(s).

The Valid VSL Triplets previously described include the ERROR ACTION (EAC), USER DEFINED FIELD (UDF) and DATE and TIME (DTT) triplets.

The following triplet is also optional and valid.

ENTRY CATEGORY (ECT)—The ECT selects the category(s) for the calendar entry(s) to be selected in the view request. Only one ECT is allowed in a View Select structure. When more than one category is selected in the ECT, the view returned will contain the selected categories. If both the ECT and UDF triplet are omitted, all entries in the selected timespan will be returned.

The DTT triplet dates and times must occur in ascending order. The first DTT processed must provide the earliest date and time block. The last DTT processed must provide the latest date and time block. The first DTT also provides the begin date and time for the timespan selected.

When the optional ECT triplet is present, the VSL triplets must occur in the order ECT, DTT.

CALENDAR TRIPLETS DETAIL DESCRIPTION

This section describes in detail the set of calendar triplets that are the building blocks designed to be used by the Calendar Structures of the system including those described in the previous section.

The previous section indicated where these triplets are valid.

The triplets are described in alphabetic order.

In the triplet descriptions, bits are consecutively numbered from left to right starting with zero.

The format for all of the triplets is the same and is shown below.

| BYTES | NAME | TYPE | MIN | MAX | LGTH | OPT |
|-------|------|------|-----|-----|------|-----|
| 0 | LENGTH | NUM | | | | R |
| 1 | KEYWORD | COD | | | | R |
| 2-n | PARM1 to PARMn | | | | | R | where
LENGTH=A one-byte value of the number of bytes in this triplet including byte zero.

KEYWORD=a one-byte binary number that designates a specific triplet function.

PARM1 to PARMn=Parameters containing the triplet settings.

The length of some triplets can vary depending on the number of parameters specified. If the length excludes an optional parameter or part of an optional parameter, then the value for that parameter and any parameters that follow are not changed; that is, the LENGTH field is used as specified. If a triplet is received in which the length exceeds the maximum value required to include all parameters, an exception is raised since the additional values are considered to be unsupported parameters. Also, if the length field excludes a required parameter, an exception is raised.

Since bytes 1 and 2 of all the triplets are identical, they are not shown for each triplet. Only bytes 2 through n will be described.

NETWORK ADDRESS (NAD) TRIPLET DATA STRUCTURE

The NAD triplet data structure is shown below.

| BYTES | NAME | TYPE | MIN | MAX | LGTH | OPT |
|-------|------|------|-----|-----|------|-----|
| 2-n | Network Address | COD | * | * | 16 | O |

The NAD triplet provides the Network Address for the item named in the (NME) triplet.

The NAD Parameters include,
NETWORK ADDRESS—This is the person's Network Address.
Bytes 2 through 9=USER ID
BYTES 10 through 17=NODE ID

POSTAL ADDRESS (PAD) TRIPLET DATA STRUCTURE

The PAD triplet data structure is shown below.

| BYTES | NAME | TYPE | MIN | MAX | LGTH | OPT |
|-------|------|------|-----|-----|------|-----|
| 2-n | Postal Address | COD | * | * | 1-253 | O |

The PAD triplet provides the Postal Address for the item named in the (NME) triplet.

The PAD Parameters include,
POSTAL ADDRESS—This is the person's Postal Address. Valid values are valid characters in the active or selected code page.

PROCESS ID (PRD) TRIPLET DATA STRUCTURE

The PRD triplet data structure is shown below.

| BYTES | NAME | TYPE | MIN | MAX | LGTH | OPT |
|-------|------|------|-----|-----|------|-----|
| 2-n | Process | COD | * | * | 1-16 | O |

The PRD triplet specifies the ID of a process such as a computer program.

The PRD Parameters include,
PROCESS—A 1 to 16 byte identifier. Valid values are valid characters in the active or selected code page.

CALENDAR SCOPE (CSC) TRIPLET DATA STRUCTURE

The CSC DS is shown below.

| BYTES | NAME | TYPE | MIN | MAX | LGTH | OPT |
|---|---|---|---|---|---|---|
| 2-3 | Calendar Begin Day | NUM | 1 | 366 | 2 | R |
| 4-5 | Calendar Begin Year | NUM | -32K | 32767 | 2 | R |
| 6-7 | Calendar End Day | NUM | 1 | 366 | 2 | R |
| 8-9 | Calendar End Year | NUM | -32K | 32767 | 2 | R |

The CSC triplet defines the timespan supported by the calendar.

CSC Parameters

CALENDAR BEGIN DAY—The day of the year that the calendar timespan begins.

CALENDAR BEGIN YEAR—This is the begin year for the timespan supported in the calendar.

CALENDAR END DAY—The day of the year that the calendar timespan ends.

CALENDAR END YEAR—This is the end year for the timespan supported in the calendar.

CALENDAR TYPE (CTP) TRIPLET DATA STRUCTURE

The CTP DS is shown below

| BYTES | NAME | TYPE | MIN | MAX | LGTH | OPT |
|---|---|---|---|---|---|---|
| 2 | Type | NUM | 0 | 5 | 1 | R |

The CTP triplet specifies the calendar type. It is only valid when used in the Calendar Profile. It defines how to present an entire calendar.

CTP Parameters

TYPE—Specifies the calendar type such as Gregorian, Julian, Muhammadan, Jewish, Lunar, Shop.

DATE AND TIME (DTT) TRIPLET DATA STRUCTURES

The DTT DS is shown below.

| BYTES | NAME | TYPE | MIN | MAX | LGTH | OPT |
|---|---|---|---|---|---|---|
| 2 | Daylight Saving Indicator | NUM | 0 | 1 | 1 | R |
| 3 | Time Zone Indicator | NUM | -23 | 23 | 1 | R |
| 4-5 | Begin Date Day | NUM | 1 | 366 | 2 | R |
| 6-7 | Begin Date Year | NUM | -32K | 32767 | 2 | R |
| 8-9 | Begin Time | NUM | 0 | 86400 | 3 | R |
| 11-12 | End Date Day | NUM | 1 | 366 | 2 | O |
| 13-14 | End Date Year | NUM | -32K | 32767 | 2 | O |
| 15-17 | End Time | NUM | 0 | 86400 | 3 | O |
| 18-254 | Additional Date/Time Combinations | | | | | |

The DTT triplet specifies the dates and times for the associated triplets in the calendar structure.

DTT Parameters

DAYLIGHT SAVINGS INDICATOR—Specifies Daylight Savings Time is active. This parameter, in conjunction with the Time Zone, identifies the time zone and allows the correct time zone label (i.e., CST or CDT) to be applied to the time.

TIME ZONE INDICATOR—The Time Zone Indicator is the displacement from Greenwich Mean Time (GMT) for the time specified. Values are specified in half hours from GMT to handle half-hour zones.

BEGIN DATE DAY—The day of the year when the event begins.

BEGIN DATE YEAR—The year the event begins.

BEGIN TIME—Begin Time specifies the event start time in seconds.

END DATE DAY—The day of the year when the event ends.

END DATE YEAR—The year the event ends.

END TIME—End Time specifies the event stop time in seconds.

Date is specified as a combination of two, two byte parameters (day of the year and year). Time is local time in seconds beginning at midnight. One Begin Date and Begin Time is required in each DTT triplet. The Begin and End, Date and Time sequence may be repeated if additional begin and end date and begin and end times are needed.

If more dates and times then can be sent in one DTT triplet are needed, additional DTT triplets can be included in the Calendar Structure. The only restriction is the byte structure length.

DETAIL (DTL) DATA STRUCTURE

The DTL DS is as follows.

| BYTES | NAME | TYPE | MIN | MAX | LGTH | OPT |
|---|---|---|---|---|---|---|
| 2-1+n | Character String | COD | * | * | n | R |

The DTL triplet contains character data in the active or selected code page.

DTL Parameters

CHARACTER STRING—Text information associated with a calendar entry. Values are valid characters in the active or selected code page.

If the CGCSGID (SCG) is changed in a character string, the DTL triplet must be ended and another one built after inserting the SCG.

ENTRY CATEGORY (ECT) DATA STRUCTURE

The ECT DS is shown below.

| BYTES | NAME | TYPE | MIN | MAX | LGTH | OPT |
|---|---|---|---|---|---|---|
| 2-5 | Category | BST | | | 4 | R |

The ECT triplet provides a specific category for unavailable time and for open time on a calendar. The ECT triplet is used to specify calendar entry category(s) in requests and replies for both the Date and Time Map (DTM) and the View Select (VSL) structures.

ECT Parameter

CATEGORY—A four byte, bit encoded value. Combinations of more than one category bit are allowed. The categories provide both request and response categories for both Date and Time Map (DTM) and View Select (VSL) calendar structures. Bits 0 through 20 may be used for both DTM and VSL categories. Bits 21 through 24 are used in View Select only. If they are used in a Date and Time Map, they are ignored.

BIT SIGNIFICANCE ENCODING

0=Holiday (General)—The owner will work on this holiday.
1=Holiday (Confirmed)—A confirmed calendar owner holiday.
2=Holiday (Tentative)—A tentative calendar owner holiday.
3=Vacation (Confirmed)—Confirmed calendar owner vacation.
4=Vacation (Tentative)—Tentative calendar owner vacation.
5=Offsite (Confirmed)—The calendar owner will not be at the normal work location and will not be available.
6=Offsite (Tentative)—The calendar owner has tentatively scheduled an activity away from the normal work location.
7=Not Normal Work Hours—Categorizes hours that are not normally worked.
8=Confirmed Meetings (Not Attended)—The calendar owner will not attend.
9=Confirmed Meetings (Attended)—The calendar owner will attend.
10=Confirmed Meetings (May Attend)—The calendar owner's status for this meeting is tentative.
11=Tentative Meetings (Not Attended)—The calendar owner will not attend.
12=Tentative Meetings (Attended)—The calendar owner will attend this meeting if it becomes confirmed.
13=Tentative Meetings (May Attend)—The calendar owner's status for this meeting is tentative.
14=Confirmed Appointments (Not Attended)—The calendar owner will not attend.
15=Confirmed Appointments (Attended)—The calendar owner will attend.
16=Confirmed Appointments (May Attend)—The calendar owner's status for this appointment is tentative.
17=Tentative Appointments (Not Attended)—The calendar owner will not attend.
18=Tentative Appointments (Attended)—The calendar owner will attend this appointment if it becomes confirmed.
19=Tentative Appointments (May Attend)—The calendar owner's status for this appointment is tentative.
20=Non-Scheduled Time—Identifies open time on the calendar. This category is most effective if used alone.
21=Date and Time Only (VIEW SELECT ONLY)—Selects date and time for all categories not specifically requested in a View Select.
22=Private Entry (VIEW SELECT ONLY)—Only date and time may be provided in the response to a calendar View Select request.
23=Calendar Comments (VIEW SELECT ONLY)—Character data entries.
24=Triggers (VIEW SELECT ONLY)—Entries that start a process and/or notify.
25-31=Reserved If all Category bits are set to one in a request for a Date and Time Map, the information returned is meaningless because it includes both scheduled and non-scheduled time. The "Non-Scheduled Time" bit should be used carefully if it is used with other bits to obtain meaningful data. The "Not Normal Work Hours" bit should also be used carefully for similar reasons.

ENTRY CLASSIFICATION (ENC) DATA STRUCTURES

The ENC DS is as follows

| BYTES | NAME | TYPE | MIN | MAX | LGTH | OPT |
|---|---|---|---|---|---|---|
| 2-3 | Classification | BST | | | 2 | R |

The ENC triplet provides a specific Classification code for a calendar entry that occupies a block of time.

ENC Parameters

CLASSIFICATION—A two byte bit encoded value. Combinations of more than one Classification Bit are not allowed.

BIT SIGNIFICANCE ENCODING

0=Holiday—(General)NThe owner will work on this holiday.
1=Holiday—(Confirmed) A confirmed calendar owner holiday.
2=Holiday—(Tentative) A tentative calendar owner holiday.
3=Vacation—(Confirmed) Confirmed calendar owner vacation.
4=Vacation—(Tentative) Tentative calendar owner vacation.
5=Offsite—(Confirmed) The calendar owner will not be at the normal work location and will not be unavailable.
6=Offsite—(Tentative) The calendar owner has tentatively scheduled an activity away from the normal work location.
7=Not Normal Work Hours—Identifies times that the calendar owner is normally not at work.

ERROR ACTION (EAC) DATA STRUCTURE

The EAC DS is as follows

| BYTES | NAME | TYPE | MIN | MAX | LGTH | OPT |
|---|---|---|---|---|---|---|
| 2 | Action | BST | | | 1 | R |

The EAC triplet specifies the action required when an exception is processed.

EAC Parameter

ACTION—The error action specification.

BIT

0=0—(DEFAULT) Report the exception, take a default action and continue.
0=1—Ignore the exception, take a default action and continue.

An EAC triplet may occur at any place in a calendar structure. If an error action is not specified, the default is to report the error, take a default action and continue.

The Error Action specified in a calendar structure remains active only until the structure end, at which time, the default Error Action becomes active.

EVENT STATUS (EVS) DATA STRUCTURE

The EVS DS is as follows.

| BYTES | NAME | TYPE | MIN | MAX | LGTH | OPT |
|-------|------|------|-----|-----|------|-----|
| 2 | Event Status | BST | | | 1 | R |

The EVS triplet provides status for an event such as an appointment or meeting.

EVS Parameter

EVENT STATUS—The status of an event.

BIT SIGNIFICANCE ENCODING

0=Confirmed (the meeting time has been established)
1=Tentative (the meeting is tentative)
2=Cancelled (the meeting was cancelled)
3=Postponed (the new date and time are not set)
4=Rescheduled (the meeting has been rescheduled)
5=Marked for Archive (entry will be saved for reference)

NAME (NME) DATA STRUCTURE

The NME DS is as follows.

| BYTES | NAME | TYPE | MIN | MAX | LGTH | OPT |
|-------|------|------|-----|-----|------|-----|
| 2 | Name Type | BST | | | 1 | R |
| 3 | Associated Triplets | BST | * | * | 1 | R |
| 4-n | Item Name | COD | * | * | 1-251 | R |

The NME triplet specifies a name of either a person or a calendar.

NME Parameters

NAME TYPE—Specifies the name type. Bits 1 and 2 are mutually exclusive. Only one of these bits may be set to 1.

BIT SIGNIFICANCE ENCODING

0=(0—Name is a personal name). (1—Name is a calendar name).
1=1—Name is a primitive name not unique in a network
2=1—Name is a descriptive name unique in a network).
3-7=Reserved ASSOCIATED TRIPLETS—Bits set to 1 specify that User Status (UST), Network Address (NAD) and Postal Address (PAD) triplets may follow the NME triplet in any order.
0=A User Status (UST) triplet follows that specifies the named items role and status.
1=An Network Address (NAD) triplet follows that specifies the named item's network address(es).
2=A Postal Address (PAD) triplet follows that specifies the named item's postal address(es)
ITEM NAME—Specifies the name of a person or calendar. Values are valid characters in the active or selected code page. The maximum name size is 251 bytes.

The item named by the NME triplet may be further identified using the User Status (UST), the Postal Address (PAD) and the Network Address (NAD) triplets.

The NME triplet must be preceded with an SCG triplet if the characters used are not on the active code page.

NAMES LIST TYPE (NLT) DATA STRUCTURE

The NLT DS is as follows.

| BYTES | NAME | TYPE | MIN | MAX | LGTH | OPT |
|-------|------|------|-----|-----|------|-----|
| 2-3 | List Type | BST | | | 2 | R |

The NLT triplet specifies the type of data contained in a list.

NLT Parameter

LIST TYPE—Specifies the list type. Combinations of bits are allowed. and/or mail addresses.

BIT SIGNIFICANCE ENCODING

2=1—Name is a Nickname associated with a network addresses. 2-15 Reserved.

The lists may optionally contain postal addresses and user status. The NLT triplet describes the list contents for specific list types. Lists containing the NLT are constrained to the specified contents. If the NLT is omitted the lists may contain any valid combination of names, user status and addresses.

PLACE (PLC) DATA STRUCTURE

The PLC DS is as follows:

| BYTES | NAME | TYPE | MIN | MAX | LGTH | OPT |
|-------|------|------|-----|-----|------|-----|
| 2-n | Location | COD | * | * | 1-253 | R |

The PLC triplet specifies a location for an event such as a meeting or appointment. The location is described using text characters. The maximum location length is limited to 253 text bytes.

PLC Parameters

LOCATION—Location specifies the event location.

RSVP (RVP) DATA STRUCTURE

The RVP DS is as follows:

| BYTES | NAME | TYPE | MIN | MAX | LGTH | OPT |
|-------|------|------|-----|-----|------|-----|
| 2 | RSVP | BST | | | 1 | R |

The RVP triplet indicates that an attendance response is required.

RVP Parameter

RSVP—Specifies the need for a response to a meeting schedule request.

BIT SIGNIFICANCE ENCODING

0=No attendance response is required.
1=An attendance response is required using the NML structure.

SET CODED GRAPHIC CHARACTER SET GLOBAL ID (SCG) DATA STRUCTURE

The SCG DS is as follows:

| BYTES | NAME | TYPE | MIN | MAX | LGTH | OPT |
|---|---|---|---|---|---|---|
| 2-3 | GCSGID | NUM | 1 | 65534 | 2 | R |
| 4-5 | CPGID | NUM | 1 | 65534 | 2 | R |

The SCG triplet specifies the coded graphic character set global identification that is used to map subsequent text into presentable graphics.

The CGCSGID that is specified by the system selects the active Character Set and Code Page. If the CGCSGID is not specified the default Character Set and Code Page specified are used.

SCG Parameters

CGCSGID—Coded Graphic Character Set Global ID; a concatenation of 2 two-byte numbers. The first two bytes identify the Graphic Character Set Global ID (GCSGID) expressed as a binary value. The second two bytes identify the Code Page Global ID (CPGID) expressed as a binary value.

GCSGID—Graphic Character Set Global ID.
CPGID—Code Page Global ID.

GCSGID and CPGID are used to determine how coded text characters are translated to the graphic characters to be presented.

The SCG will only select a code page for the triplet that immediately follows it. If structures containing text characters on a code page that is different from the default code page are concatenated, a separate SCG is required preceding each structure.

The SCG has no affect on the NETWORK ADDRESS in the UDF triplet and the USER CODE in the UDF triplet.

STRUCTURE ID (SID) DATA STRUCTURE

The SID DS is as follows:

| BYTES | NAME | TYPE | MIN | MAX | LGTH | OPT |
|---|---|---|---|---|---|---|
| 2 | ID Type | BST | | | 1 | R |
| 3-n | Identifier | COD | * | * | n | R |

The SID triplet provides an identifier for calendar structures.

SID Parameters

ID TYPE—Specifies the ID type

BIT SIGNIFICANCE ENCODING

0=Entry ID—Identifies a calendar entry
1=Names List ID—Identifies a list of names
2=Trigger ID—Identifies a trigger
3=Profile ID—Identifies a calendar profile IDENTIFIER—1 to 44 character identifier The SID provides a correlation ID to accomplish calendar updates from an intelligent workstation to a host, to correlate responses to a meeting notice with the meeting names list and to correlate notification of a list of people associated with a meeting or a list.

SUBJECT (SBJ) DATA STRUCTURE

The SBJ DS is as follows:

| BYTES | NAME | TYPE | MIN | MAX | LGTH | OPT |
|---|---|---|---|---|---|---|
| 2-n | Event Subject | COD | * | * | 1-253 | R |

The SBJ triplet specifies the subject for an event. The subject is described using text characters.

SBJ Parameters

EVENT SUBJECT—This parameter specifies the event subject.

TIME STEP (TMS) DATA STRUCTURE

The TMS DS is as follows.

| BYTES | NAME | TYPE | MIN | MAX | LGTH | OPT |
|---|---|---|---|---|---|---|
| 2 | Daylight Savings Indicator | NUM | 0 | 1 | 1 | R |
| 3 | Time Zone Indicator | NUM | −23 | 23 | 1 | R |
| 4-5 | Begin Date Day | NUM | 1 | 366 | 2 | R |
| 6-7 | Begin Date Year | NUM | −32K | 32767 | 2 | R |
| 8-10 | Begin Time | NUM | 0 | 86400 | 3 | R |
| 11 | Network Address Length | NUM | 0 | 128 | 1 | O |
| 12-n | Network Address | COD | | | ~128 | O |

The TMS triplet specifies an entry's time zone, creation date and time and the entry creator's network address.

TMS Parameters

DAYLIGHT SAVINGS INDICATOR—Specifies Daylight Savings Time is active. This parameter, in conjunction with the Time Zone, identifies the time zone and allows the correct time zone label (i.e.,. CST or CDT) to be applied to the time.

TIME ZONE INDICATOR—The Time Zone Indicator is the displacement from Greenwich Mean Time (GMT) for the time specified. Values are specified in half hours from GMT to handle half hour zones.

BEGIN DATE YEAR—The year the event begins.
BEGIN TIME—Begin Time specifies the event start time.

NETWORK ADDRESS LENGTH—The Network Address length
NETWORK ADDRESS—System address
Bytes 12 thru 19=USER ID—valid characters in CP256, CS930.
Bytes 20 thru 27=NODE ID—valid characters in CP256, CS930.
Bytes 28 thru 139=Reserved to support additional address.

USER DEFINED FIELD (UDF) DATA STRUCTURE

The UDF DS is as follows:

| BYTES | NAME | TYPE | MIN | MAX | LGTH | OPT |
|---|---|---|---|---|---|---|
| 2 | Priority | NUM | 1 | 10 | 1 | R |

| BYTES | NAME | TYPE | MIN | MAX | LGTH | OPT |
|---|---|---|---|---|---|---|
| | | -continued | | | | |
| 2-9 | User Code | COD | * | * | 1-8 | R |

The UDF triplet provides a priority and user defined field that is assigned by the calendar owner. The assigned code provides additional entry categories.

UDF Parameters

PRIORITY—A one byte field that specifies a priority value for a calendar entry. 1 is the highest and 10 is the lowest priority.

USER CODE—An eight byte user defined code.

USER STATUS (UST) DATA STRUCTURE

The UST DS is as follows:

| BYTES | NAME | TYPE | MIN | MAX | LGTH | OPT |
|---|---|---|---|---|---|---|
| 2 | Role | COD | 0 | 7 | 1 | R |
| 3 | Personal Status | COD | 0 | 5 | 1 | R |

The UST triplet provides information regarding the person named in the Name (NME) triplet. It provides the named persons Role and Personal Status.

UST Parameters

ROLE—Specifies the persons role regarding the event.

VALUES

0=Caller—Person has called the event.
1=Arranger—Person is arranging the event.
2=Invitee (Default)—Person has been invited to the event.
3=Mandatory Invitee—Person who must attend the meeting.
4=Alternate—Person replacing an invitee for attendance consideration.
5=Additional Attendee—Person who is adding themselves to the distribution list associated with a group meeting.
6=Receives Copy—Person who receives event information.
7=Receives Blind Copy—Person who receives event information only, whose name will not appear on the distribution list.

PERSONAL STATUS—The status associated with the name.

VALUES

0=No Action (no status has been received)
1=Confirmed (the person will attend)
2=Tentative (the person might attend)
3=Not Attending (the person will not attend)
4=User Acknowledge (received the invitation)
5=Alternate (the invitee will not attend, but an alternate may)

WORK TIMES (WTM) DATA STRUCTURE

The WTM DS is as follows:

| BYTES | NAME | TYPE | MIN | MAX | LGTH | OPT |
|---|---|---|---|---|---|---|
| 2 | Daylight Savings Indicator | NUM | 0 | 1 | 1 | R |
| 3 | Time Zone Indicator | NUM | −23 | 23 | 1 | R |
| 4-6 | Begin Time | NUM | 0 | 86400 | 3 | R |
| 7-9 | End Time | NUM | 0 | 86400 | 3 | R |
| 10-254 | Additional Begin/End Time Combinations | | | | | |

The WTM triplet specifies the work times for an associated calendar. Time is local time in seconds beginning at midnight.

DAYLIGHT SAVINGS INDICATOR—Specifies Daylight Savings Time is active. This parameter, in conjunction with Time Zone, identifies the time zone and allows the correct time zone label (i.e., CST or CDT) to be applied to the time.

TIME ZONE INDICATOR—The Time Zone Indicator is the displacement from Greenwich Mean Time (GMT) for the time specified. Values are specified in half hours from GMT to handle half hour zones.

BEGIN TIME=Begin Time specifies the time block begin in seconds.

END TIME—End Time specifies the time block end in seconds.

One Begin Time and End Time is required in each WTM triplet. The Begin and End Time sequence may be repeated if additional begin and end times are needed.

THE PROCESS OF CALENDARING AN EVENT

FIG. 3a is a screen that is displayed to the operator/calendar owner in response to the operator indicating to the system that he wants to calendar an event. Assume that a meeting has been scheduled at 10:00 a.m. on Thursday, Oct. 7, 1986 and that the request for the meeting was not issued through the electronic calendaring system. The owner then enters the following information into the system employing the screens of FIGS. 3b and 3c. To identify the type of event, after selecting option 1 on screen 3a, the operator merely presses the enter key since the cursor has automatically been positioned at the event, e.g., "Meeting" on the screen of FIG. 3b. The next entry involves assigning a priority to this event. The value to be entered is from 1-10, as indicated on the line following the blank for the value. The function of the priority number is to establish the relative importance of this event when viewed with regard to other commitments which are either planned or anticipated. This entry of a priority value is optional since the system will establish a default priority for the event according to some predetermined criteria which has been established for all calendar owners or alternately which is a unique default for each specific individual.

The assignment of a priority value to a calendar event either explicitly by the calendar owner or implicitly by the system is a necessary step in the view select process implemented in accordance with the method described and claimed in cross referrenced application Ser. No. (AT'046). The function of the priority value is described in detail in that application.

Other data that the operator must enter includes the date, the start time and end time of the meeting. Data that is optional would include the official event identifier, the name of the individual who has called the meeting, the subject of the meeting, the place of the meeting, and any details that the calendar owner may care to provide in the detail field.

FIG. 3c is the third screen presented to the calendar owner during the process of entering an event. This screen permits the owner to establish the security level of the calendar entry and his status relative to the event. This screen is also employed to set a trigger that will provide an alarm, a predetermined time before the time that an identified event is scheduled to begin in order to notify the owner of the impending event. The screen permits the individual to select one or more trigger types and also permits the individual to select whether the trigger should be "Fixed" or "Float". If the trigger is to Float, the ID of the event with which it will float is required. This screen also permits the individual to designate an external process i.e. an application program that can be run on the system, to be started at the designated time. As indicated earlier, the trigger types may be combined if desired.

It should be understood that a response screen showing meeting details may be shown to a calendar owner as a result of receiving a request to attend an event. In this case the calendar owner would select the proper response.

The Trigger which was established by the caller of the Meeting is also sent to the meeting invitees along with the meeting notice.

The process of calendaring other event types is substantially the same as calendaring a meeting type event. Priorities may be assigned to Appointments, Vacations, Holidays, and Not Normal Work Hours type events. The note type calendar entry does not use a priority value. Triggers may be established for these events in the manner just described in connection with the Meeting event.

Figure 4:
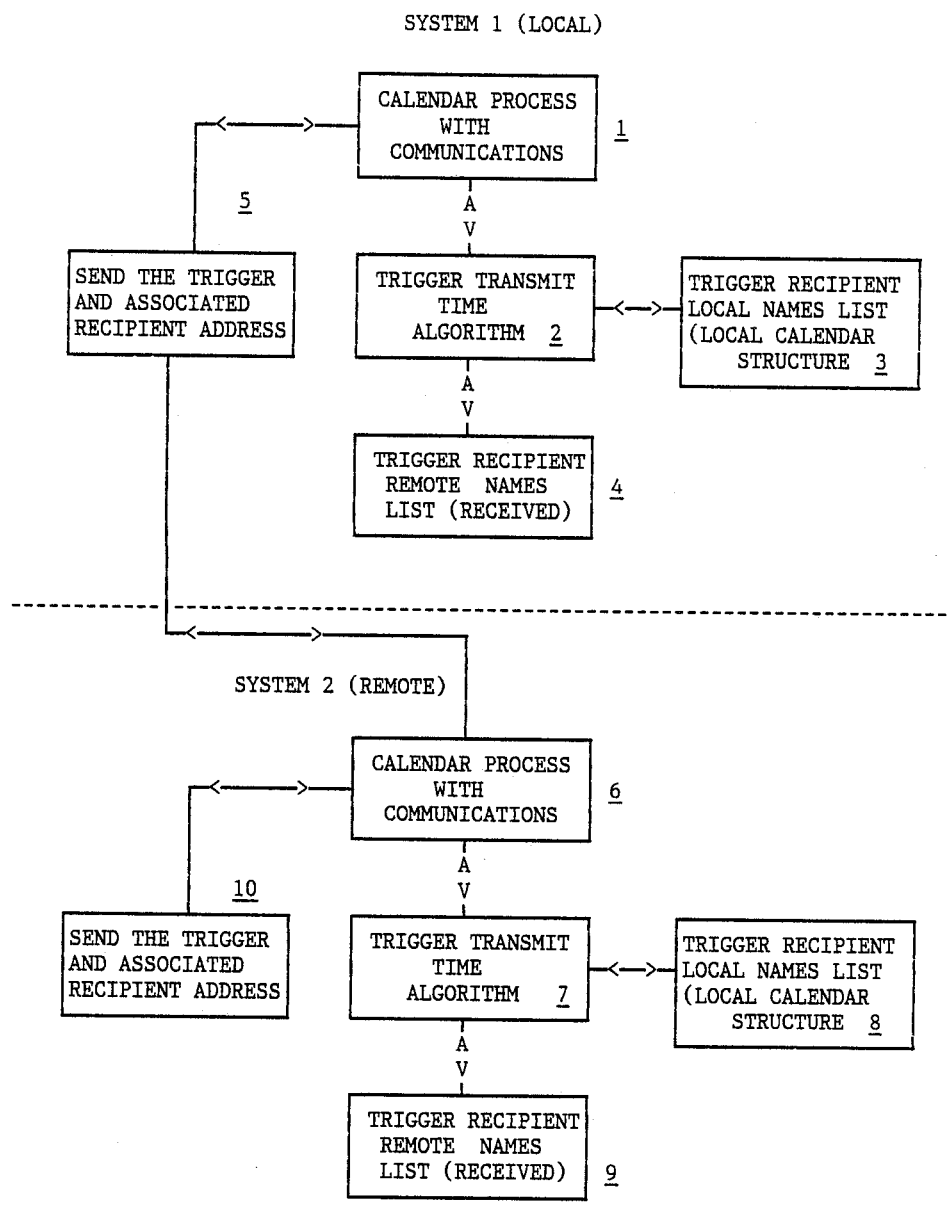
FIG. 4 is a flowchart, illustrating various detailed steps involved in the improved electronic calendaring method.

FIG. 4 illustrates the various steps involved in the method that allows the caller of the meeting to send the trigger that he has established on his calendar to the meeting invitees along with the meeting notice. Corresponding triggers are therefore set for the meeting event on all the respective calendars.

In the flowchart of FIG. 4, The Calendar Process 1 interacts with the Trigger Transmit Time Algorithm 2, which in turn interacts with the Receipient Local Name List 3 and the Received Names List 4. The Names list contains the the network addresses for the receipients of the Meeting Notice and the associate Trigger. When it is determined that the trigger should be sent, the Calendar Process 1 activates Send The Trigger functional block 5 to send the trigger to either a remote or local receipient. When a Trigger is sent to a remote location, the Names List structure containing only the receipient's address is also sent. This allows a remote location to activiate Trigger transmission locally at the proper time. When the Calendar Process 6 on System 2 receives the Trigger and Names List structures the two structures are stored. System 2 then operates the same as System 1.

The following is a listing of pseudocode statements which sets forth in detail the the Trigger Transmit Time algorithm that is employed by both System 1 and System 2 in the flow chart of FIG. 4. Triggers can be sent up to two days in advance to allow for time differences and for transmission delays. The Names List associated with the Trigger will be accessed continuously until all Triggers are sent. If two names list exist Local and Received, they are accessed alternately, one completed list then the other. Different lists can exist for different Triggers.

When a Calendared event is moved or canceled and the associate Trigger type has been designated to "Float", the Trigger data structure that contains the ID of the event, has the Trigger time modified automatically to maintain the same relative amount of lead time for the event. If the meeting is cancelled the Trigger is also cancelled automatically. The above described operations occur on both System 1 and System 2.

| PSEUDOCODE LISTING |
| --- |
| 1. IF the Received Names List (RNL) was accessed last and all entries have been accessed in the RNL |
| 1. Then |
| 2. .IF there are more entries to be accesses in the Local Names List (LNL) |
| 2. .THEN access the LNL and mark the LNL accessed last |
| 2. .ELSE access the RNL and mark the RNL accessed last |
| 2. .ENDIF |
| 1. ELSE access the RNL and mark the RNL accessed last |
| 1. ENDIF |
| 1. Fetch the next name from the list accessed |
| 1. IF the Trigger recipient is 6 to 12 times zones away |
| 1. THEN |
| 2. .IF the current time is within 48 hours of Trigger time and the Trigger has not been sent |
| 2. .THEN send the Trigger in a Trigger structure and the recipient address in a Names List structure and mark the Trigger sent |
| 2. .ENDIF |
| 1. ELSE |
| 2. .IF the Trigger recipient is not local |
| 2. .THEN |
| 3. ..IF the current time is is within 24 hours of Trigger time and the Trigger has not been sent |
| 3. ..THEN send the Trigger structure and the recipient address in a Names List structure and mark the Trigger sent |
| 3. ..ENDIF |
| 2. .ELSE |
| 3. ..IF the Trigger recipient is local |
| 3. ..THEN |
| 4. ...IF the current time is Trigger time |
| 4. ...THEN send the Trigger and mark the Trigger sent |
| 4. ...ENDIF |
| 3. ..ENDIF |
| 2. .ENDIF |
| 1. ENDIF |

While the invention has been shown and illustrated with reference to a preferred embodiment, it will be understood by those skilled in the art that various modifications may be made without departing from the spirit of the invention and scope of the appended Claims. For example, it is possible for each real terminal in FIG. 2 to establish a number of virtual terminals, each of which would be assigned to a different individual who would maintain his calendar using the virtual terminal that would have a unique address.

We claim:

1. An electronic calendaring method for use in a data processing system having a plurality of interactive workstations, each of which is assigned to at least one individual who maintains a calendar on said system, each of said calendars including a plurality of data structures for storing data in designated fields that is related to said calendared event, said data structures including a Trigger data structure for reminding the calendar owner(s) of a subsequent calendared event, said method comprising the steps of;

(a) establishing an event ID field in said Trigger data structure for storing the system ID of the event to be triggered and a trigger time field for storing a trigger time, (b) establishing a mode field in said Trigger data structure for storing a float mode indicator that causes the initial relationship between said Trigger data structure and said event to be maintained automatically whenever the related event data structure corresponding to said event identified in said event ID field is subsequently processed, (c) displaying an event calendaring screen to said calendar owner to assist in entering said event data and said Trigger data in said system, and (d) processing said Trigger data structure in response to processing said related event data structure to determine if said mode field contains said float mode indicator.

2. The method recited in claim 1, further including the step of establishing at least one other data structure for storing data defining the participation of a plurality of other calendar owners on said system in the event being calendared.

3. The method recited in claim 2, in which said step of displaying also assists in entering event classifying data and the identification of said other calendar owners for storage in said at least one other data structure.

4. The method recited in claim 3, in which said step of processing includes processing said event identifying data structure.

5. The method recited in claim 4, in which said step of processing further includes the step of notifying said other calendar owners of said event being calendared that involves their said participation by sending said data structures to each of said other owners.

6. The method recited in claim 5, in which said step of notifying also includes sending said Trigger data structure to said other owners.

7. The method recited in claim 6, further including the step of automatically modifying data in said Trigger data structure in response to modifying data in said associated event identifying data structure when said mode field contains said float indicator.

8. The method recited in claim 6, further including the step of automatically modifying a Trigger data structure that was previously sent to said other calendar owners in response to the associated event data structure being modified if said mode field contains said float indicator.

9. The method recited in claim 8, further including the step of automatically modifying the data in said trigger time field in response to a change in time of the identified event.

10. The method recited in claim 9, further including the step of generating a reminder at said workstation for said assigned individual at the time stored in the trigger time field of said Trigger data structure.

11. The method recited in claim 10, in which said step of generating said reminder involves displaying a visual message to said individual.

12. The method recited in claim 10, in which said step of generating said reminder involves developing an audio signal at a volume level which is sufficient to alert said individual.

* * * * *